United States Patent
Choi et al.

(10) Patent No.: US 10,594,548 B2
(45) Date of Patent: Mar. 17, 2020

(54) HOME NETWORK INFORMATION

(71) Applicant: Hewlett Packard Enterprise Development LP, Houston, TX (US)

(72) Inventors: Byung Kyu Choi, Roseville, CA (US); Mark W. Fidler, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/140,612

(22) Filed: Sep. 25, 2018

(65) Prior Publication Data

US 2019/0028334 A1 Jan. 24, 2019

Related U.S. Application Data (63) Continuation of application No. 14/397,433, filed on Oct. 27, 2014, now abandoned.

(51) Int. Cl.
  *H04L 12/24* (2006.01)
  *H04L 12/28* (2006.01)
  *H04L 12/46* (2006.01)

(52) U.S. Cl.
  CPC ...... *H04L 41/0803* (2013.01); *H04L 12/2807* (2013.01); *H04L 12/462* (2013.01); *H04L 41/0866* (2013.01)

(58) Field of Classification Search
  CPC ............ H04L 41/0803; H04L 12/2807; H04L 12/462; H04L 41/0866
  See application file for complete search history.

(56) References Cited

U.S. PATENT DOCUMENTS

| | | | |
|---|---|---|---|
| 7,103,774 B2 | 9/2006 | Wildish et al. | |
| 7,266,383 B2 | 9/2007 | Anderson | |
| 7,313,628 B2* | 12/2007 | Chaskar | H04W 36/0011 370/331 |
| 7,343,158 B2 | 3/2008 | Mizell et al. | |
| 7,480,307 B2* | 1/2009 | Chaskar | H04W 36/0011 370/255 |
| 7,545,754 B2* | 6/2009 | Funato | H04L 12/2854 370/254 |

(Continued)

OTHER PUBLICATIONS

Zorn et al., "RADIUS Attributes for Tunnel Protocol Support," Network Working Group, RFC 2865, Jun. 2000, 20 pages.

(Continued)

*Primary Examiner* — Jerry B Dennison
(74) *Attorney, Agent, or Firm* — Hewlett Packard Enterprise Patent Department (57) ABSTRACT

An example includes a communication interface and a mapping module. The communication interface is to receive a request from an access point, wherein the request is for home network information. The mapping module is to receive the request from the communication interface and determine, based on a first table, a second switch where the requested home network information is stored. The mapping module is then to cause the communication interface to transmit the request received from the access point to the second switch; receive, via the communication interface, a response from the second switch, wherein the response comprises the requested home network information. The mapping module then causes the communication interface to transmit the received home network information on to the access point.

15 Claims, 9 Drawing Sheets

(56) References Cited

U.S. PATENT DOCUMENTS

| | | | |
|---|---|---|---|
| 8,675,601 | B2 | 3/2014 | Calhoun et al. |
| 2002/0069262 | A1 | 6/2002 | Rigori et al. |
| 2003/0142674 | A1* | 7/2003 | Casey ................. H04L 12/4633 370/393 |
| 2004/0081086 | A1 | 4/2004 | Hippelainen et al. |
| 2005/0041808 | A1* | 2/2005 | He ...................... H04L 63/0272 380/248 |
| 2006/0209768 | A1 | 9/2006 | Yan et al. |
| 2008/0002607 | A1* | 1/2008 | Nagarajan ............ H04W 8/087 370/328 |
| 2008/0104661 | A1 | 5/2008 | Levin et al. |
| 2008/0235511 | A1 | 9/2008 | O'Brien et al. |
| 2008/0274765 | A1* | 11/2008 | Lopez .................... H04W 4/60 455/552.1 |
| 2009/0029677 | A1* | 1/2009 | Choi ................... H04L 63/0869 455/411 |
| 2009/0047948 | A1 | 2/2009 | Turetsky et al. |
| 2009/0158394 | A1 | 6/2009 | Oh et al. |
| 2009/0279452 | A1* | 11/2009 | Akiyoshi .......... H04W 36/0011 370/254 |
| 2010/0040029 | A1 | 2/2010 | Doppler et al. |
| 2010/0074186 | A1* | 3/2010 | Patterson ............. H04W 40/02 370/328 |
| 2010/0154050 | A1 | 6/2010 | Mukkara et al. |
| 2011/0004913 | A1* | 1/2011 | Nagarajan ............ H04L 63/102 726/1 |
| 2011/0019539 | A1* | 1/2011 | Suzuki ................ H04L 49/3009 370/225 |
| 2011/0098043 | A1 | 4/2011 | Yu et al. |
| 2011/0261800 | A1 | 10/2011 | You et al. |
| 2011/0274035 | A1 | 11/2011 | Yadav et al. |
| 2011/0274036 | A1 | 11/2011 | Calhoun et al. |
| 2012/0083266 | A1* | 4/2012 | Vanswol .................. H04W 8/04 455/433 |
| 2013/0003547 | A1 | 1/2013 | Motwani et al. |
| 2013/0223399 | A1 | 8/2013 | Lu et al. |
| 2013/0287012 | A1 | 10/2013 | Pragada et al. |
| 2013/0288668 | A1 | 10/2013 | Pragada et al. |
| 2014/0321377 | A1 | 10/2014 | Ryu et al. |
| 2015/0131475 | A1 | 5/2015 | Van et al. |
| 2015/0142986 | A1 | 5/2015 | Reznik et al. |
| 2015/0282234 | A1 | 10/2015 | Sartori et al. |
| 2015/0289125 | A1 | 10/2015 | Van et al. |
| 2015/0326430 | A1* | 11/2015 | Choi ................... H04L 12/2807 709/220 |
| 2016/0255567 | A1* | 9/2016 | Petersson ................ H04W 8/12 455/432.1 |
| 2017/0188339 | A1 | 6/2017 | Chai et al. |
| 2019/0028334 | A1* | 1/2019 | Choi ................... H04L 12/2807 |

OTHER PUBLICATIONS

Rigney et al., "Remote authentication dial in user service (RADIUS)," RFC 2865, Network Working Group, Obsoletes: 2138, Jun. 2000, 76 pages.

Perkins et al., "Mobility Support in IPv6," RFC 6275, Internet Engineering Task Force, Jul. 2011, 169 pages.

Nelson et al., "Common Remote Authentication Dial in User Service (RADIUS) Implementation Issues and Suggested Fixes" Request for Comments: 5080, Network Working Group, Dec. 2007, 28 pages.

Nakhjiri et al., "Mobile IPv4 RADIUS Requirements," RFC 5030, Network Working Group, Oct. 2007, 9 pages.

International Search Report and Written Opinion received for PCT Patent Application No. PCT/US2012/046023, dated Mar. 11, 2013, 7 pages.

International Preliminary Report on Patentability received for PCT Patent Application No. PCT/US2012/046023, dated Jan. 22, 2015, 6 pages.

Droms, R., "Dynamic Host Configuration Protocol", RFC 2131, Network Working Group, Mar. 1997, 45 pages.

Droms et al., "Dynamic Host Configuration Protocol for IPv6 (DHCPv6)" RFC 3315, Network Working Group, Jul. 2003, 101 pages.

Deering, S., "ICMP Router Discovery Messages", RFC 1256, Network Working Group, Sep. 1991, 19 pages.

Conta et al., "Internet Control Message Protocol (ICMPv6) for the Internet Protocol Version 6 (IPv6) Specification," RFC 4443, Network Working Group, Mar. 2006, 24 pages.

C. Perkins, Ed., "IP Mobility Support for IPv4 Revised," RFC 5944, Internet Engineering Task Force, Nov. 2010, 100 pages.

"Information technology—Telecommunications and information exchange between systems—Local and metropolitan area networks—Specific requirements—Part 11: Wireless LAN Medium Access Control (MAC) and Physical Layer (PHY) Specification", IEEE Std. 802.11, IEEE Computer Society, 2007, 1232 pages.

"IEEE Standard for Local and metropolitan area networks: Station and Media Access Control Connectivity Discovery", IEEE Std. 802.1AB, IEEE Computer Society, 2005, 172 pages.

"Mobile IP Home Agent Elements and Behavior"; Juniper Networks, Inc.; Apr. 16, 2012, 2 pages.

* cited by examiner

Fig. 1

MASTER TABLE 200

| User Attributes 210 | Home Network Information 220 |
|---|---|
| User 1<br>Login Name<br>Password<br>Class<br>MAC Address<br>IP Address<br>Home VLAN<br>Home Department<br>Home Building<br>Visiting VLAN<br>Visiting Department<br>Admin Status | MAC/IP Address: Home VLAN<br>MAC/IP Address: Home Department<br>MAC/IP Address: Home Building |
| ⋮<br>User N | |

*Fig. 2*

INDEX TABLE

| Attribute Range | Switch Identifiers |
|---|---|
| Attribute $X_1$ - $X_{99}$ | Switch Address A |
| Attribute $X_{100}$ - $X_{199}$ | Switch Address B |

Range 1, Range 2, ... Range N 310, 320, 300

*Fig. 3*

SUBSET TABLE 400

Range = k
0 < k ≤ N

| Attribute (410) | Home Network Information (420) |
|---|---|
| User/Device 1 Attribute | Home Network Info at User/Device 1 |
| User/Device 2 Attribute | Home Network Info at User/Device 2 |
| User/Device 3 Attribute | Home Network Info at User/Device 3 |

HOME NETWORK INFORMATION

CROSS-REFERENCE TO RELATED APPLICATIONS

This application is a continuation of U.S. patent application Ser. No. 14/397,433, filed on Jul. 10, 2012, which is a national stage of PCT/US2012/046023 filed on Jul. 10, 2012, the entire contents of which are incorporated by reference herein. The Applicant hereby rescinds any disclaimer of claim scope in the parent application or the prosecution history thereof and advises the USPTO that the claims in this application may be broader than any claim in the parent application(s).

BACKGROUND

With the prevalence of users traveling with network-enabled mobile devices (e.g., laptops, tablets, smartphones, etc.), the concept of a "home network" has emerged in the networking technology space. A home network is generally a point of presence on a network, where each user/device in the network is registered with one of a plurality of home networks on the network, and where the user's device appears as a wired device on the home network regardless of where the device is connected to the network. For example, in the context of an academic campus environment, there may be hundreds or even thousands of access points that a user may utilize as an entry point to the campus network. However, regardless of which access point the user utilizes to connect to the campus network, the user/device may appear as a wired device on the user's home network (e.g., the Computer Science Department VLAN), and the user's data traffic may be redirected to the user's home network.

BRIEF DESCRIPTION OF THE DRAWINGS

Examples are described in the following detailed description and in reference to the drawings, in which.

DETAILED DESCRIPTION

Various aspects of the present disclosure are directed to home network information processing. More particularly, various aspects of the present disclosure are directed to a novel and previously unforeseen approach to home network information processing that distributes home network information lookup and retrieval processes among various network components.

As mentioned above, the concept of a "home network" has been introduced to make associated devices appear as wired clients on the home network regardless of where the devices are connected to the network. As part of this approach, the network identifies the home network for a particular user/device and redirects traffic between the home network and the device. This home network identification process is typically conducted by a "central server" or registry that stores mapping information between a user/device and a home network. In particular, the central server may receive requests for home network information and provide responses to such requests based on the stored mapping between the user/device and the home network.

While the above-mentioned home network identification process that relies on a central server may be sufficient for some environments, in other environments, the process may not be sufficient or at least optimal because the central server may become inundated with more requests than it can handle in a short period of time. For instance, in an academic campus environment, students do not roam in a random fashion. Rather, they tend to move according to a class schedule and stay together at a specific geographic location at specific times of the week in a generally synchronized fashion. This "flocking" pattern tends to engulf the central server with a high number of home network information requests within a very short period of time (e.g., shortly before or after the beginning of class). Due to the central server's finite amount of processing capability, the central server may be delayed in processing these requests, and therefore creates a performance bottleneck. As a result, students may experience delays or timeouts when attempting to connect to the campus network. Moreover, if the central server fails or temporarily malfunctions, the network connectivity for the entire campus network may be affected. That is, the central server may be a single point of failure for the campus network. Still further, the central server may raise concern about scalability due at least to its limited processing capability.

Various aspects of the present disclosure address at least the above by providing an approach that may eliminate or at least mitigate concern about a single point of failure, scalability, and/or performance bottlenecks by distributing home network information lookup and retrieval processes among various network devices. In particular, and as discussed in greater detail below with reference to various examples and figures, various aspects of the present disclosure may address the potential traffic storm at a central server by distributing home network information as well as a mapping of where such information is stored among a plurality of network devices such as switches.

In one example in accordance with the present disclosure, a system is provided. The system comprises a first switch and a second switch. The first switch is to receive a request for home network information (e.g., from an access point), and access a first stored table that comprises a mapping between an attributes (e.g., user attributes or device attributes) and switch identifiers, wherein the first table may be provided earlier by a central server. Based thereon, the first switch may determine a second switch that stores the requested home network information. The first switch may transmit the request for home network information to the second switch. The second switch may receive the request and access a second stored table that comprises a mapping between attributes and home network information to determine the requested home network information. Once identified, the second switch may transmit the requested home network information to the first switch, which may then transmit the home network information to the device that requested the home network information. Hence, the switches may conduct the home network information lookup and retrieval processes in a distributed manner as opposed to the above-mentioned and problematic centralized approach.

In another example in accordance with the present disclosure, a switch is provided. The switch comprises a communication interface and a mapping module. The communication interface may receive a request from an access point, wherein the request is for home network information. The mapping module may receive the request from the communication interface and determine, based on a first table, a second switch where the requested home network information is stored. The mapping module may then cause the communication interface to transmit the request to the second switch, and subsequently receive a response from the second switch which comprises the requested home network information. The mapping module may then cause the communication interface to transmit the received home network information to the access point. The access point may then conduct traffic redirection to the home network based at least in part on the home network information provided by the switch.

In yet another example in accordance with the present disclosure, a non-transitory machine-readable medium is provided. The machine-readable medium comprises instructions which, when executed, cause a device to receive a request for home network information and check a first table to determine if the requested home network information is stored at the device. If the home network information is stored at the device, the instructions cause the device to obtain the home network information from a second table at the device and transmit a response with the requested home network information. If, on the other hand, the home network information is not stored at the device, the instructions cause the device to determine based on the first table which other device stores the home network information, and transmit the request for home network information to the other device that stores the home network information.

Figure 1:
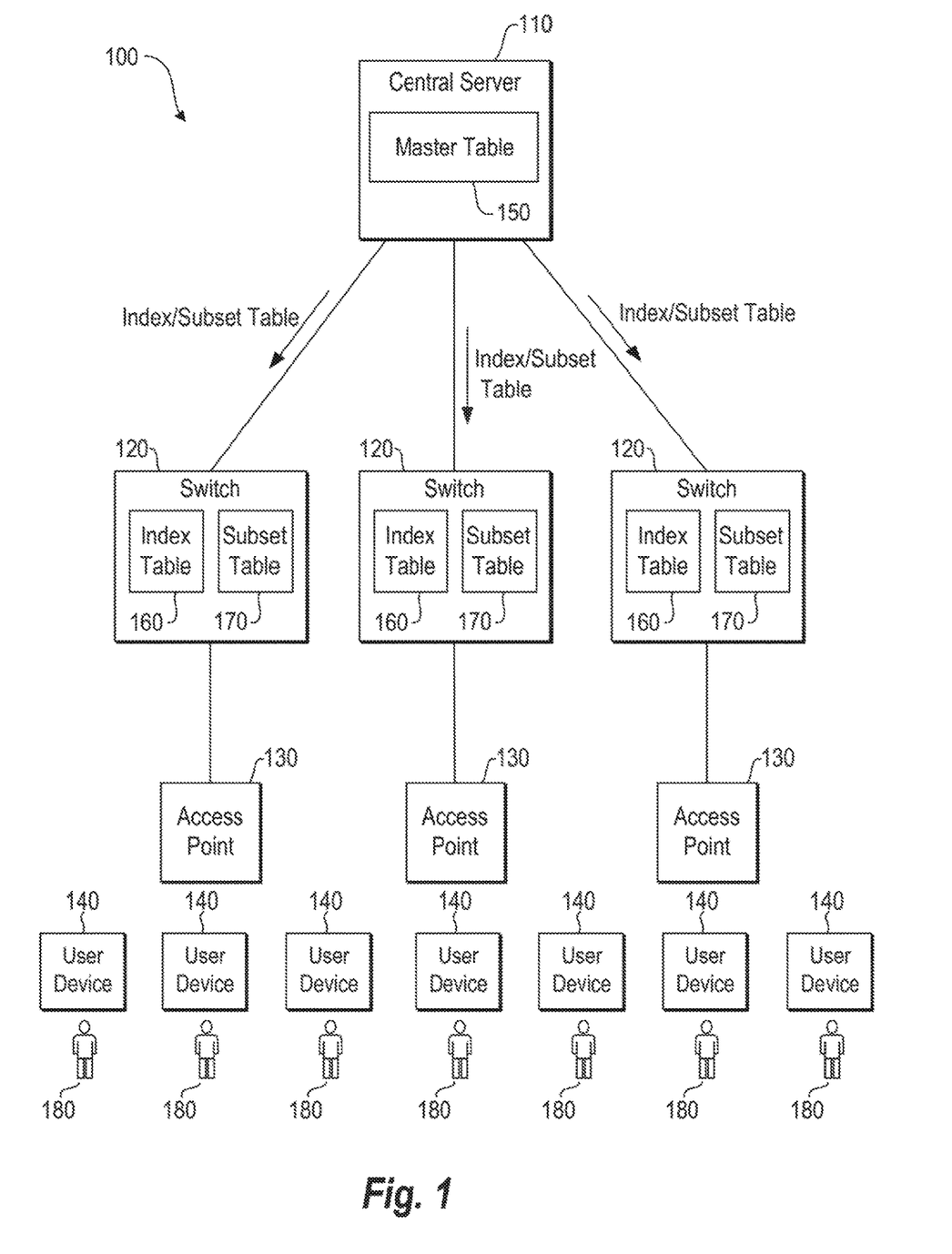
FIG. 1 depicts an example system in accordance with an implementation.

FIG. 1 depicts an example system 100 in accordance with an implementation. The system comprises a central server 110, a plurality of switches 120, a plurality of access points 130, and a plurality of user devices 140. In some implementations, the system 100 may be associated with an academic campus network. In other implementations, the system 100 may be associated with a corporate network, a building network, or any other type of similar communication network. It should be readily apparent that the system 100 is a generalized illustration and that other elements may be added or existing elements may be removed, modified, or rearranged without departing from the scope of the present disclosure. For example, while the system 100 depicted in FIG. 1 includes only three switches 120, three access points 130 and seven user devices 140, the system 100 may actually comprise hundreds or even thousands of such devices.

As used herein, the "central server" may be understood as a central computing device, registry, and/or application that stores and distributes home network mapping information to other network devices. The central server may be a stand-alone device or integrated with another device such as a local area network (LAN) controller, remote authentication dial in user service (RADIUS) server, dynamic host configuration protocol (DHCP) server, or the like.

As used herein, the "home network" may be understood as a point of presence on the network, where each user in the network is registered with a particular local area network (LAN), virtual local area network (VLAN), IP subnet, switch, router, and/or server, and where such registration may occur on a permanent or semi-permanent basis.

As used herein, "home network information" may be understood as information that identifies a particular home network. This identification information may be user-specific, such that the home network information provides a mapping between a particular user and a particular home network. Alternatively or in addition, the identification information may be device-specific, such that the home network information provides a mapping between a particular device (e.g., a laptop, smartphone, or tablet) and a particular home network.

As used herein, a "switch" may be understood as networking device that connects other network devices via network segments and forwards packets to and from the other network devices via the network segments and associated ports.

As used herein, an "access point" may be understood as a network device that provides an entry point to a network for user devices. The access point may comprise, for example, transceiver circuitry to wirelessly communicate with user devices.

As used herein, a "user device" may be understood as a computing device such as a mobile computing device, laptop, tablet, smartphone, desktop, workstation, gaming console, scientific instrument, or the like that benefits from connection to a network. In various examples, the user device may be associated with a user that operates the user device.

With reference to FIG. 1, the central server 110 may generate, store, and/or update a master table 150. As described in further detail with respect to FIG. 2, this master table 150 may comprise information regarding all the registered users 180 and/or devices 140 on a particular network (e.g., each student and/or student device on academic institution network) and their respective home networks. For example, for each user 180 and/or device 140, the master table 110 may store attributes about the user/device (e.g., login name, password, class, MAC/IP address(es), etc.) and home network information (e.g., MAC/IP address of home VLAN, etc.). This master table 150 may be maintained in a database associated with the central server 110 and may be updated periodic or continuously based on, e.g., user/device registration changes.

Based on the above-described master table 110, the central server 110 may generate, maintain, and distribute at least two types of tables to each of one or more switches 120; an index table 160 and a subset table 170. The index table 160 and subset table 170 may be used by the switches 120 to conduct home network lookup and retrieval processes in a distributed manner without reliance on the central server 110 for such processes.

As described in more detail with reference to FIG. 3, the index table 160 may map ranges of user/device attributes to particular switch identifiers (e.g., users/devices 1-99→switch A, users/devices 100-199→switch B, users/devices 200-299→switch C, etc.). More particularly, the index table 160 may map users/devices that fall in an attribute range to a switch that stores home network information for that range in the switch's respective subset table 170. Thus, when a switch 120 receives a request for home network information from an access point 130, the switch 120 may refer to the index table 160 to identify which switch is storing the requested home network information. In some instances, the switch 120 may determine that it stores the requested home network information in its own subset table 170. In other instances, the switch 120 may determine that another switch stores the requested home network information in that switch's subset table 170, and therefore the request should be relayed to that switch.

As described in more detail with reference to FIG. 4, the subset table 170 may generally comprise a subset of the master table. In particular, the subset table 170 may comprise a mapping between user/device attributes and home network information (e.g., user/device attribute 1→home network A, user/device attribute 2→home network C, user/device attribute 3→home network Z, etc.). Such information may be utilized to respond to a request for home network information originating from, e.g., an access point. For example, a user 180 that is registered with the central server and that is remote from the user's home network may transmit a join request to an access point 130 via the user's device 140. In response to this join request, and after or during access control processing, the access point 130 may transmit a request for home network information to an attached switch 130. The attached switch 130 may access its index table 160 and utilize attribute information about the user and/or the user's device to determine which switch stores the requested home network information in the switch's subset table 170. Once the switch is identified, the attached switch 130 may transmit the request for home network information to that switch and may receive a response from the switch with the requested home network information. The attached switch may then provide this information to the access point 130 for traffic redirection to the appropriate home network.

This distributed home network lookup approach may eliminate the bottle-neck caused by a central server conducting such processing. Thus, a synchronized join event by many wireless devices, which is typical in an academic campus environment, may not overload a single network device. Moreover, since typically the number of switches proportionally increases as the number of access points increase, the entire campus network may evolve naturally in size without incurring much engineering effort to match the lookup traffic demand and the central server computing capacity.

Figure 2:
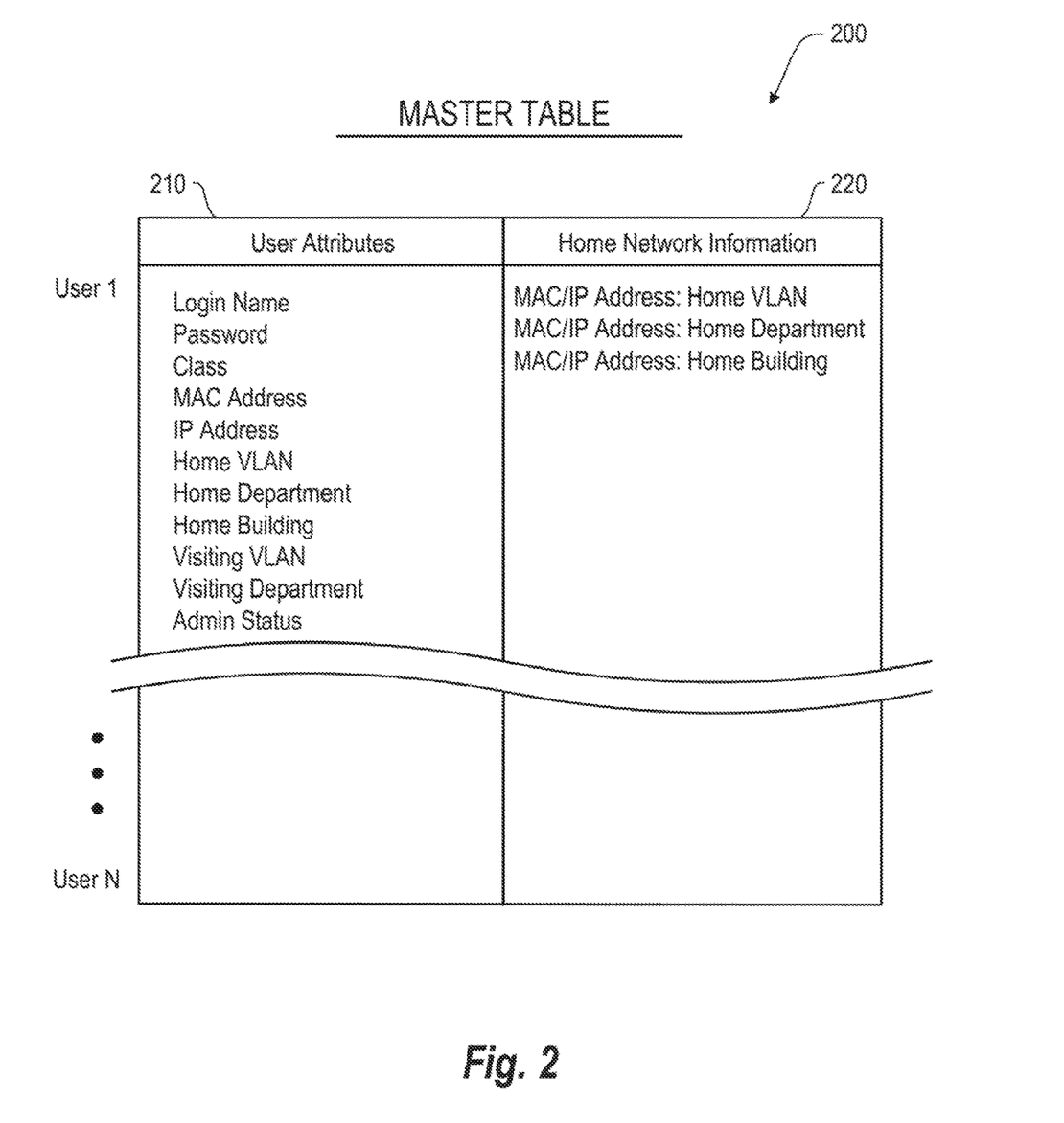
FIG. 2 depicts an example master table in accordance with an implementation.

FIG. 2 depicts an example master table 200 in accordance with an implementation. As mentioned above, the master table 200 may be generated, updated, and distributed by the central server 110 to the switches 120 and may comprise information regarding each user/device registered in the network. Such information may be updated periodically or continuously as users/devices join and/or leave the network. Moreover, such information may be updated as attributes and/or home network information changes.

The master table 200 shown in FIG. 2 generally comprises a mapping between user attributes 210 and home network information 220 for each of users 1-N, where "N" represents the total number of users registered with the network. It should be understood that multiple users may be associated with the same home network. This is because one home network (e.g., the Computer Science Department VLAN) may serve multiple users (e.g., all Computer Science students). Furthermore, it should be understood that while FIG. 2 depicts a mapping between users and home network information, the master table may alternatively or additionally include a mapping between devices and home network information in accordance with various implementations.

In the example shown in FIG. 2, the user attributes 210 associated with "User 1" include the user's Login Name (e.g., JohnDoe1234), password (e.g., a1b2c3d4), class (e.g., faculty, staff, student, visitor, etc.), user device MAC address (e.g., 12:34:56:78:ab), user device IP address (10.110.135.51 (ipv4) and 2002:12d5:b8d7:10d4:b8d7 (ipv6)), Home VLAN (e.g., Computer Science Department VLAN), Home Department (e.g., Computer Science Department), Home Building (e.g., Computer Science Department Building), Visiting VLAN (e.g., Economics Department VLAN), Visiting Department (e.g., Economics Department), Visiting Building (Economics Building), and Admin Status (e.g., granted). It should be understood that these user attributes 210 are merely exemplary, and that more, less, and/or different attributes may be utilized in accordance with various implementation of the present disclosure. For example, a single user (e.g., "User 1") may have multiple devices (e.g., a laptop, tablet, and smartphone), and therefore may have multiple user device MAC/IP addresses listed in the user attributes record 210.

The master table 220 may further comprise home network information 220 for each user. For example, as shown in FIG. 2, "User 1" may have a record with user attributes 210 that is mapped to home network information 220. The home network information 220 may provide information about the user's home network. For example, the home network information 220 may comprise MAC and/or IP addresses of the user's Home VLAN, Home Department, and/or Home Building.

As described below with respect to FIGS. 3 and 4, the central server 110 may utilize the information from the master table 200 to generate and/or update index and subset tables that are distributed to the switches. These tables may then be utilized by the switches to handle the home network information look-up processes in a distributed manner.

Figure 3:
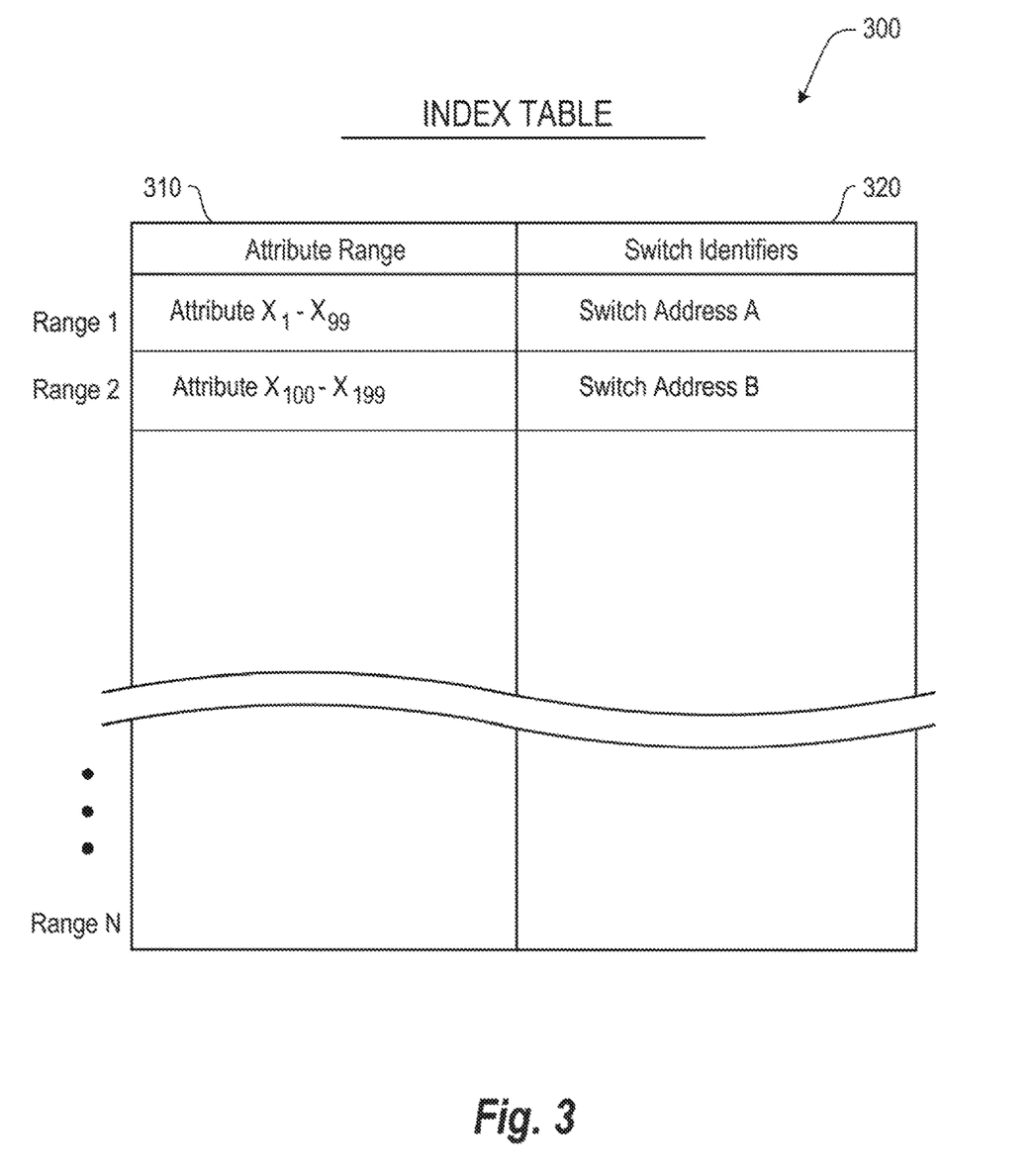
FIG. 3 depicts an example index table in accordance with an implementation.

FIG. 3 depicts an example index table 300 in accordance with an implementation. As mentioned above, the index table 300 may be provided to each switch from the central server along with a subset table. Further, as mentioned above, the index table 300 may include a mapping between attribute ranges 310 and switch identifiers 320. The attribute range 310 may be a specific range of unique user/device attributes. For example, the attribute range 310 may be a range of username values, MAC address values, password values, or other unique values associated with the user and/or device. For each range, there may be an associated switch identifier 320. The switch identifier 320 may be, for example, the IP address of a switch, a MAC address of the switch, and/or another identifier for the switch. The switch may utilize this information in the index table 310 to determine which of a plurality of switches in the network is storing the user's home network information in their respective subset table. For example, and with reference to FIG. 3, a first switch that receives a request for home network information for attribute $X_3$ from an access point may determine that the requested home network information is stored at switch address "A." The switch may then pass the request for home network information to the switch associated with switch address "A."

The central server may generate the index table 200 that is distributed to the switches in various manners depending on the implementation. In one example, the central server may sort the various records in the master table based on a specific user attribute (e.g., username) and identify ranges of that attribute to assign to each switch. For example, the master table may comprise 10,000 usernames and the central server may generate an index table 200 that assigns specific ranges of usernames to each switch. In some implementations, the central server may assign an equal number of usernames to each switch (e.g., each switch handles 1,000 usernames). In other implementations, the central server may assign different ranges of usernames to each switch (e.g., switch A handles 1,000 usernames while switch B handles 500 usernames). The determination of how to allocate the ranges may be, for example, based on the capacity of the switch, where higher capacity switches receive larger ranges than lower capacity switches. In another example, the central server may sort the various records in the master table based on a specific device attribute (e.g., MAC/IP address) and identify ranges of that attribute to assign to each switch. For example, the master table may comprise 10,000 MAC addresses, and the central server may generate an index table 200 that assigns specific ranges of MAC addresses to each switch. In some implementations, the central server may assign an equal number of MAC addresses to each switch, while in other implementations, the central server may assign a different number of MAC addresses to each switch.

Figure 4:
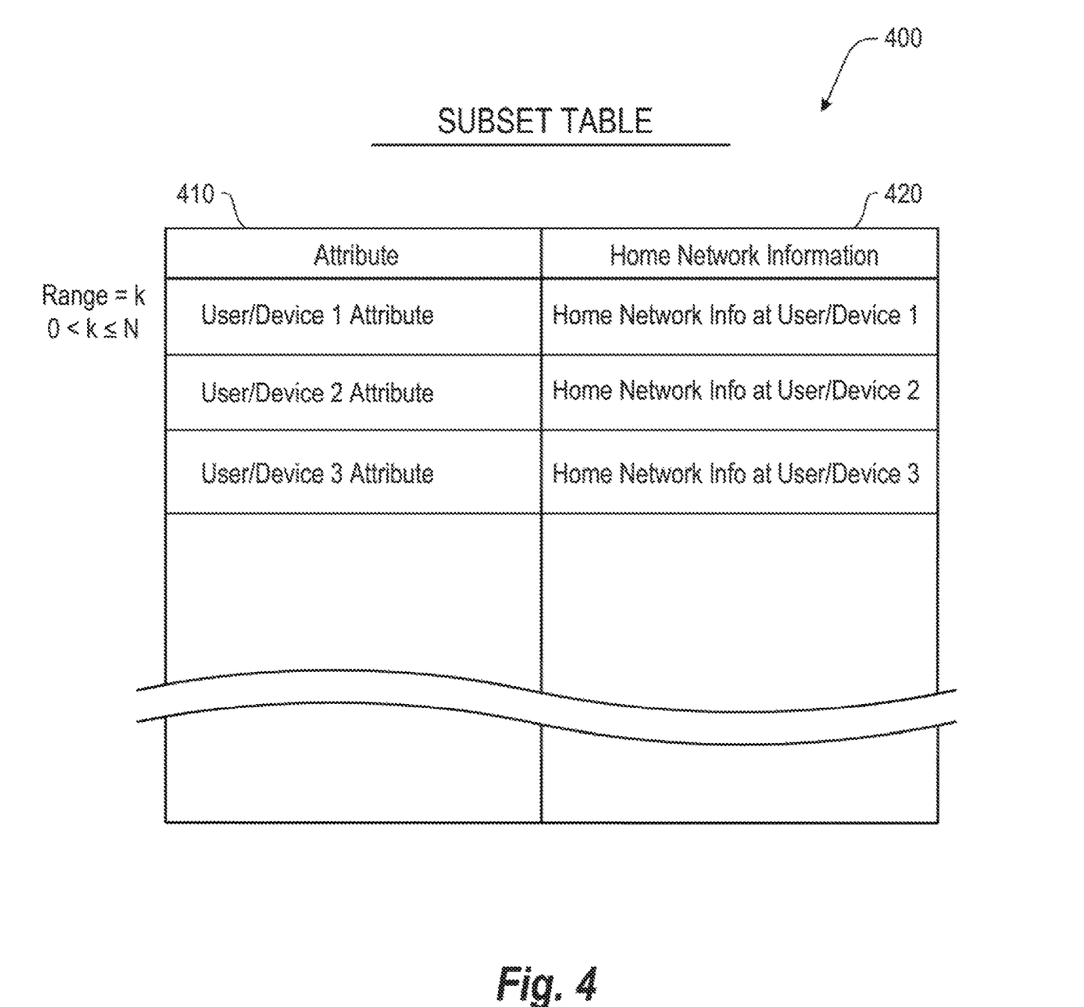
FIG. 4 depicts an example subset table in accordance with an implementation.

FIG. 4 depicts an example subset table 400 in accordance with an implementation. As mentioned above, the subset table 400 may be provided to each switch from the central server along with an index table. Further, as mentioned above, the subset table 400 may include a mapping between user/device attributes within an attribute range 410 and home network information for respective users/devices. For example, the subset table 400 may include K attributes, where K is the number of attributes assigned to the switch by the central server, and where K<N, where N is the total number of attributes in the master table. As discussed, the attribute 410 may be a user and/or device attribute that is unique to the network ((e.g., username, MAC address, etc.) and the home network information 420 may be information about the user/device's home network. For example, the home network information 220 may comprise MAC and/or IP addresses of the Home VLAN, Home Department, and/or Home Building associated with the user/device. Upon receiving a request for home network information, a switch may access the subset table 400 and find the home network information 420 for a user/device based on a particular attribute 410 associated with the user/device.

Figure 5:
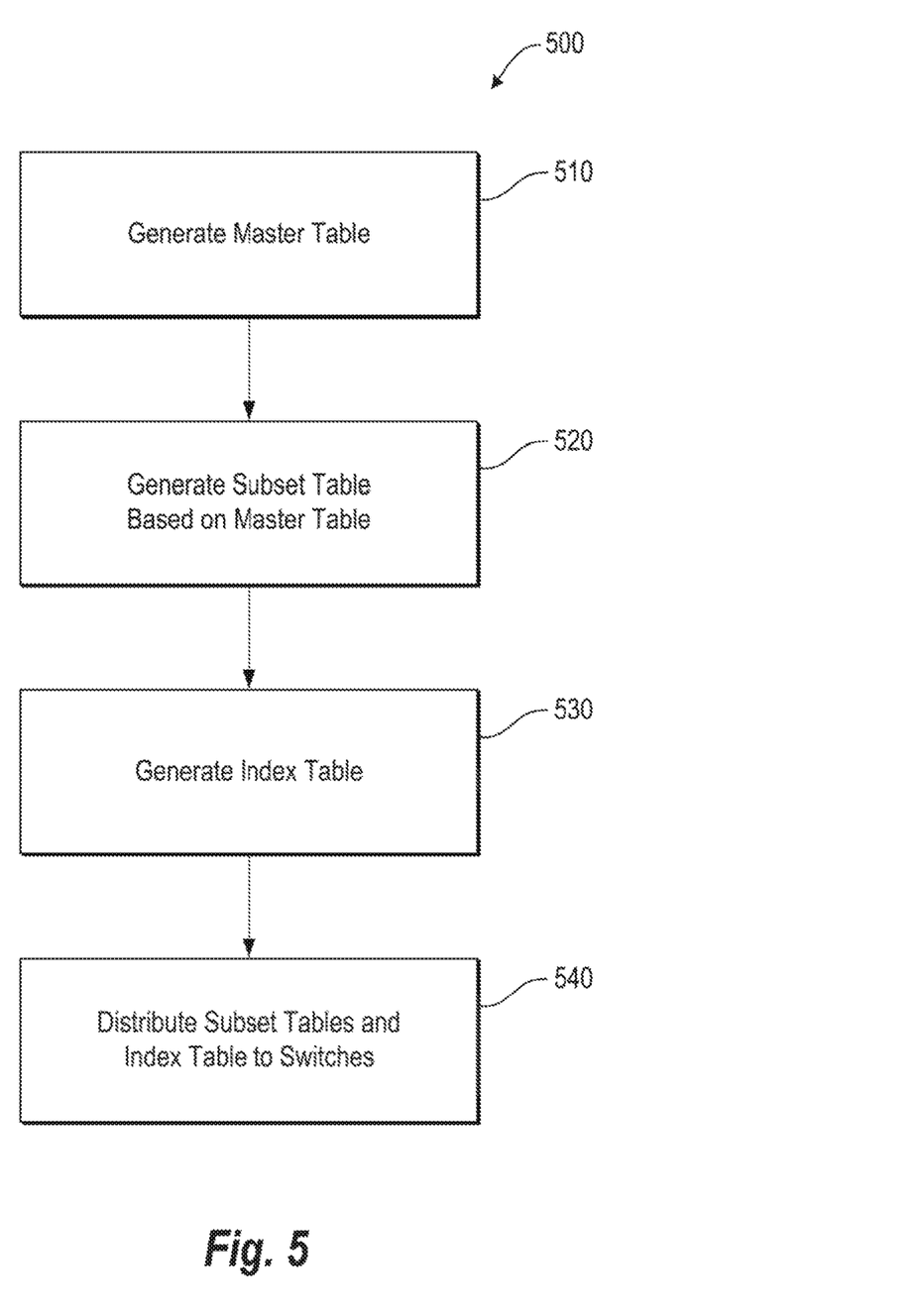
FIG. 5 depicts an example central server process in accordance with an implementation.
Figure 6:
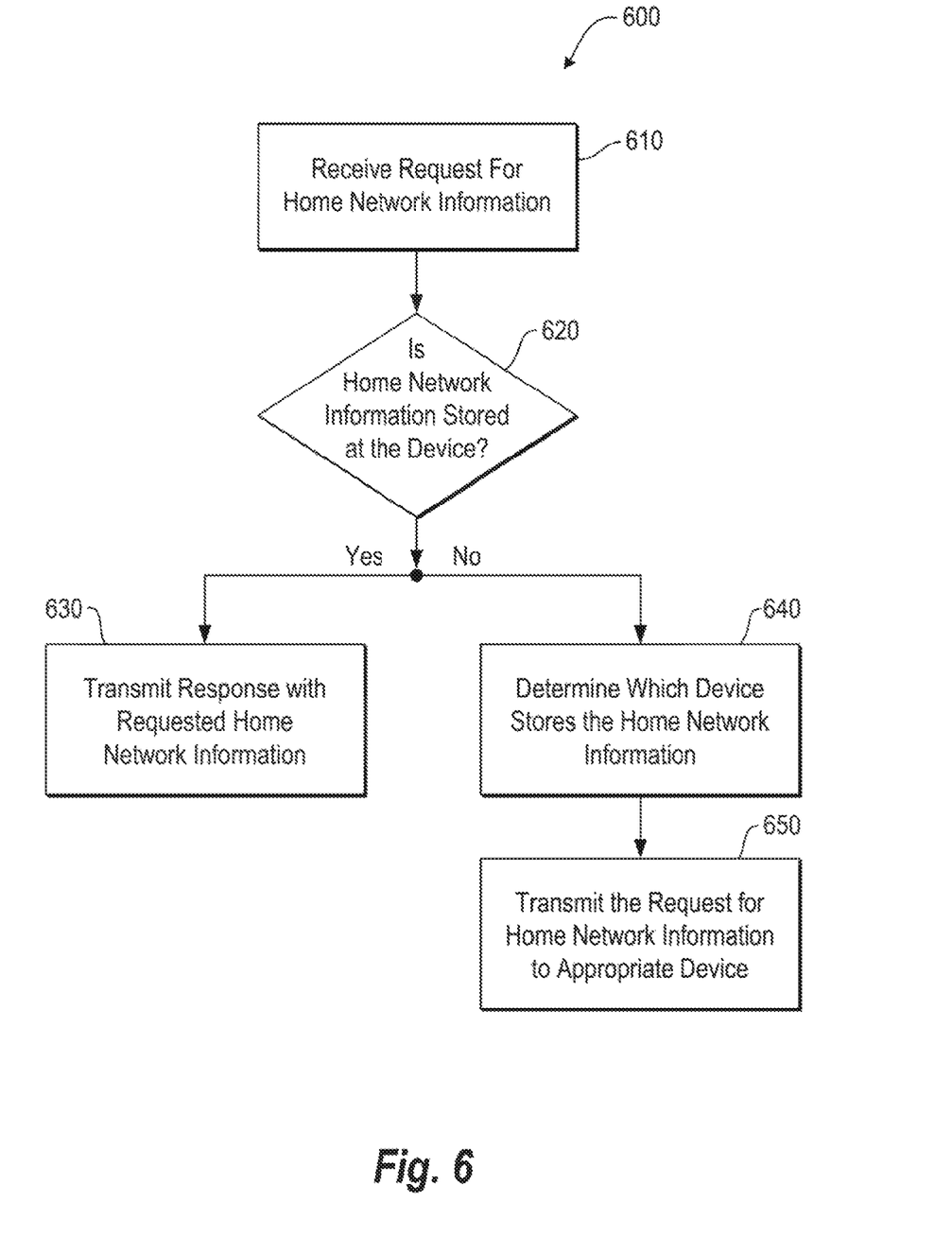
FIG. 6 depicts an example process associated with a network device in accordance with an implementation.
Figure 7:
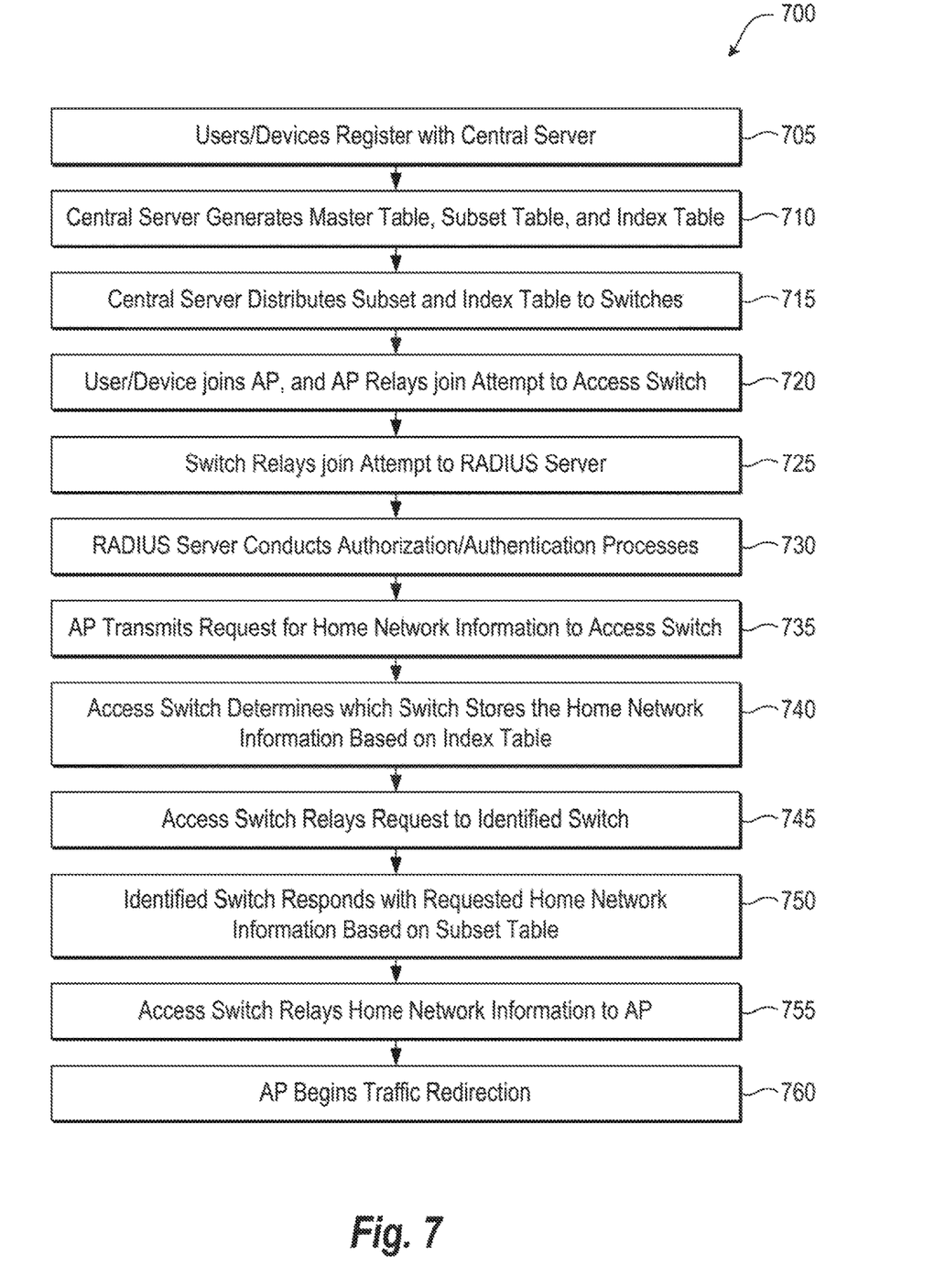
FIG. 7 depicts an example process associated with various network devices in accordance with an implementation.

FIG. 5 depicts an example central server process 500 in accordance with an implementation. It should be readily apparent that the processes depicted in FIG. 5 (as well as FIGS. 6 and 7) represent generalized illustrations, and that other processes may be added or existing processes may be removed, modified, or rearranged without departing from the scope and spirit of the present disclosure. Further, it should be understood that the processes may represent executable instructions stored on memory that may cause at least one processing device to respond, to perform actions, to change states, and/or to make decisions. Thus, the described processes may be implemented as executable instructions and/or operations provided by a memory associated with a central server. Moreover, the processes may represent functions and/or actions performed by functionally equivalent circuits like an analog circuit, a digital signal processing device circuit, an application specific integrated circuit (ASIC), or other logic devices associated. Furthermore, FIGS. 5-7 are not intended to limit the implementation of the described examples, but rather the figure illustrates functional information one skilled in the art could use to design/fabricate circuits, generate software, or use a combination of hardware and software to perform the illustrated processes.

The process 500 may begin at block 510, when the central server generates a master table. This master table may be generated, for example, based on users and/or devices that are registered with the network. In an academic campus network, therefore, the central server may generate a master based on registered students or the devices of those students. The master table may comprise the format described above with reference to FIG. 2.

After generating a master table, at block 520, the central server may generate a plurality of subset tables based on the master table. As described above with reference to FIG. 4, the subset table may comprise a portion or range of information from the master table and keyed to a particular user/device attribute. The size of each subset table may be based at least in part on the size of the switches in the network.

At block 530, the central server may generate an index table that maps the user/device attribute ranges to switch identifiers. The format of this index table may be commensurate with the description of FIG. 3 above.

At block 540, the central server may distribute the subset tables and index table to the switches. The central server may further update the master table, index table, and/or subset tables as the dynamics of the network change (e.g., users and/or devices join/leave, network devices fail or become underloaded/overloaded, communication paths fail, etc.). This distribution of updates may occur periodically, continuously, or in response to a trigger such as a command from a network administrator.

FIG. 6 depicts an example process at a network device in accordance with an implementation. Depending on the implementation, the device may be a switch, access point, or router.

The process may begin at block 610, wherein the device receives a request for home network information. At block 620, the device may access an index table stored at the device to determine where in the network the requested home network information is stored. At block 630, if the device determines based on the index table that the requested home network information is stored at the device, the device may obtain the requested home network information from a subset table stored at the device and transmit a response to the device that requested the home network information. On the other hand, if the device determines based on the index table that the requested home network information is not stored at the device, at block 640, the device may determine which device stores the requested home network information and, at block 650, transmit the request to the device that stores the home network information.

FIG. 7 depicts an example process 700 associated with various network devices in accordance with an implementation.

The process may begin at block 705 when users/devices are registered with a home network in a central server. This process may occur, for example, by a network administrator in response to a user registering credentials (e.g., a username and password) with a RADIUS server.

Thereafter, at block 710, the central server may create three tables based on the user/device registration information. The first table may be a master table which includes a mapping of users/devices (and their attributes) and home networks. The second table may be a subset table which may be obtained by dividing the master table, and which may comprise a mapping between user/device attributes and home network information. The third table may be an index table which includes a mapping between attribute ranges and switch identifiers.

At block 715, the central server may distribute the index table and the subset table to the switches. In particular, a different subset table may be distributed to each switch, while the same index table may be distributed to each switch. Thus, each switch may store an index table and a subset table.

At block 720, a user may join an access point at a remote place from their home network and the access point may relay the join attempt information to the access switch for access control. This access switch may be directly attached to the access point.

At block 725, the access switch may relay the join attempt to the RADIUS server. At block 730, the RADIUS server may conduct authorization/authentication processes. Such processes may include the RADIUS server challenging the user/device for login information such as a username and password. This challenge may take the path from the RADIUS server to the access switch to the access point to the user device. The user device may respond to the challenge, with the response taking the same path as mentioned above but in reverse order. The RADIUS server may then authenticate and authorize the network access by the user device and approval may take the same path as the challenge.

At block 735, the access point may send a request for home network information to the access switch. It should be understood that this process may occur before, in parallel, or after the processes mentioned above. At block 740, based on information provided about the user/device in the request (e.g., username, password, MAC/IP address, etc.), the switch may determine which switch stores the requested home network information by accessing the switch's index table. At block 745, the access switch may relay the request for the home network information to the identified switch. At block 750, the identified switch may respond with the requested home network information based on lookup of such information in its subset table. At block 755, the access switch may receive this response from the identified switch and may relay the home network information to the access point. The access point may then begin traffic redirection at block 760.

Figure 8:
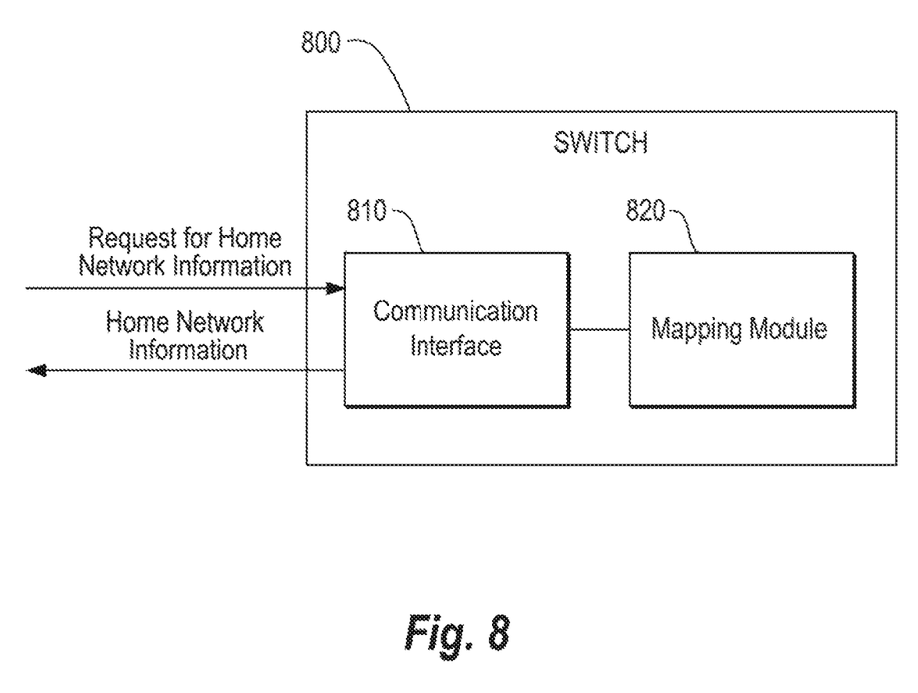
FIG. 8 depicts a block diagram of an example switch in accordance with an implementation.

FIG. 8 depicts a block diagram of an example switch 800. It should be readily apparent that the switch 800 is a generalized illustration and that other elements may be added or existing elements may be removed, modified, or rearranged without departing from the scope of the present disclosure. For example, while only a communication interface 810 and mapping module 820 are shown, it should be understood that other components, circuits, and the like may be included in accordance with implementations.

The communication interface 810 may be an interface of the switch that is configured to conduct communication functions. The communication interface 810 may comprise one or more transmitters, receivers, transceivers, PHYs, antennas and/or ports to effectuate such communication functions. In one example, the communication interface 810 may receive a request for home network information from an access point, and relay this request to the mapping module 820 via a bus. The mapping module 820 may be hardware, software, or a combination of both. For example, in one implementation, the mapping module 820 may comprise a memory that stores instructions that, when executed, cause the switch to perform functions. Alternatively or in addition, the mapping module 820 may comprise hardware equivalent circuitry or an ASIC to perform such functions. These functions may include, for example, receiving the request from the communication interface 810, determining a second switch where the home network information is stored based on a first table (e.g., the index table), transmitting the request to the second switch, receiving a response comprising the requested home network information from the second switch, and transmitting the received home network information to the access point.

Although not shown in the Figures, it should be understood that the central server may, similar to the switch in FIG. 8, comprise a communication interface and a mapping module. The mapping module may be configured to generate, update, and/or store a master table, index table, and subset table. The communication interface may be configured to distribute the index table and subset tables to the switches based on instructions from the mapping module.

Figure 9:
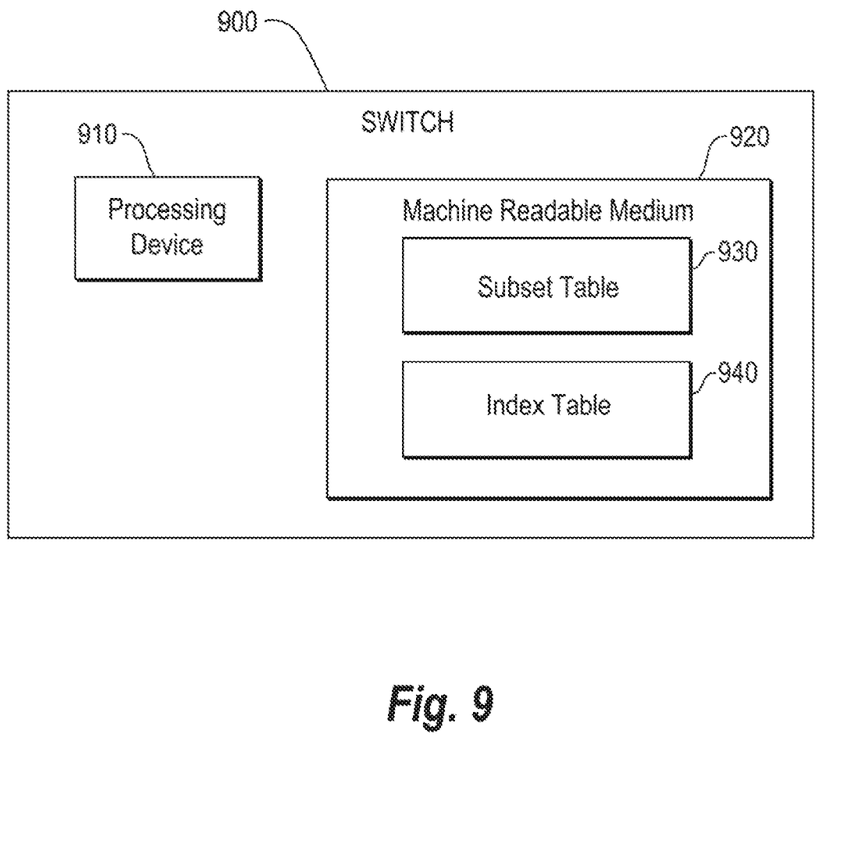
FIG. 9 depicts a non-transitory machine-readable medium that stores instructions for operating a switch in accordance an implementation.

FIG. 9 depicts a non-transitory machine-readable medium that stores instructions for operating a switch 900 in accordance with an implementation. The non-transitory computer-readable medium is generally referenced by reference number 920 and may be included in the switch 900. The non-transitory computer readable medium 920 may correspond to any typical storage device that stores machine-readable instructions, such as programming code, software, firmware, or the like. For example, the non-transitory computer-readable medium 920 may include one or more of a non-volatile memory, a volatile memory, and/or a storage device. Examples of non-volatile memory include, but are not limited to, electronically erasable programmable read only memory (EEPROM) and read only memory (ROM). Examples of volatile memory include, but are not limited to, static random access memory (SRAM) and dynamic random access memory (DRAM). Examples of storage devices include, but are not limited to, hard disk drives, compact disc drives, digital versatile disc drives, optical devices, and flash memory devices. In some embodiments, the instructions may be part of an installation package that can be executed by the processing device 910. In this case, the non-transitory machine-readable medium 920 may be a portable medium such as a CD, DVD, or flash drive or a memory maintained by a server from which the installation package can be downloaded and installed. In another embodiment, the instructions may be part of an application or application already installed. Here, the non-transitory machine-readable medium 920 can include integrated memory such as a hard drive.

The processing device 910 may be a at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. The processing device 910 may fetch, decode, and execute instructions stored on storage medium 920 to implement the functionalities described above. In various implementations, the machine-readable medium 920 may store a subset table 930 and an index table 940. These tables may be utilized to carry out home network information lookup functions in a distributed manner, and as described in detail above.

While various examples described above are with respect to academic campus, it should be understood that the present disclosure is not limited to an academic campus environment and may be utilized in all environments, including corporate campuses, offices, resorts, amusement parks, and the like, to name a few.

Furthermore, while the above describes three separate tables (i.e., the master table, index table, and subset table), it should be understood that that one or more of these tables may be combined in some implementations, and further that these table may be part of a database. Moreover, these tables could be arranged in a different manner than shown while providing the same type of mapping information in various implementations.

Additionally, while various examples were described with respect to switches, it should be understood that the present disclosure be implemented on other network devices such as access point, routers, and hubs.

While the above disclosure has been shown and described with reference to the foregoing examples, it should be understood that other forms, details, and implementations may be made without departing from the spirit and scope of the disclosure that is defined in the following claims.

What is claimed is:

1. A system, comprising:
   a first switch comprising a first processor and a first memory storing a first set of instructions; and
   a second switch comprising a second processor and a second memory storing a second set of instructions;
   wherein the first set of instructions, when executed by the first processor, cause the first processor to:
   receive a first index table and a first subset table from a central server, the first index table to map a plurality of ranges of users to respective switches for storage of home network information, and the first subset table to map each user of a first range of users to home network information for the user;
   receive a request from an access point for home network information of a first user device of a plurality of user devices;
   access the first index table to determine which switch is storing home network information for a range of users including the first user device;
   determine, based on the first index table stored on the first switch, that the second switch is storing the home network information for the first user device, wherein the first switch does not store the home network information for the first user device;
   transmit the request received from the access point to the second switch;
   receive a response from the second switch comprising the home network information of the user device; and
   transmit the home network information for the first user device to the access point; and
   wherein the second set of instructions, when executed by the second processor, cause the second processor to:
   receive a second index table and a second subset table from the central server, the second index table to map the plurality of ranges of users to respective switches for storage of home network information, and the second subset table to map each user of a second range of users to home network information for the user, the second range of users being different than the first range;
   receive the request from the first switch;
   access the second subset table to identify and retrieve the home network information for the first user device, the home network information including identification of a home network for the first user device; and
   transmit the home network information for the first user device to the first switch.

2. The system of claim 1, wherein the access point is to conduct traffic redirection to the home network for the first user device based at least in part on the home network information provided by the first switch.

3. The system of claim 1, wherein a master table of home network information for the plurality of user devices is allocated by the central server into a plurality of subset tables for a plurality of switches, the plurality of subset tables including the first subset table for the first switch and the second subset table for the second switch.

4. The system of claim 3, wherein the first switch and second switch are to receive updates from the central server to the first index table and first subset table and to the second index table and second subset table, respectively.

5. The system of claim 1, wherein the first switch is further to access the first subset table to determine if the requested home network information for the first user device is stored at the first switch before transmitting the request to the second switch.

6. A non-transitory machine readable medium comprising instructions which, when executed, cause a device to:
   receive, at a first switch, a first index table and a first subset table from a central server, the first index table to map a plurality of ranges of users to respective switches for storage of home network information, and the first subset table to map each user of a first range of users to home network information for the user;
   receive, at a second switch, a second index table and a second subset table from the central server, the index table to map the plurality of ranges of users to respective switches for storage of home network information, and the second subset table to map each user of a second range of users to home network information for the user, the second range of users being different than the first range;
   receive, at the first switch, a request from an access point for home network information of a first user device of a plurality of user devices;
   access the first index table to determine which switch is storing home network information for a range of users including the first user device;
   determine, based on the first index table stored on the first switch, that the second switch is storing the home network information for the first user device, wherein the first switch does not store the home network information for the first user device;
   transmit, by the first switch, the request received from the access point to the second switch;
   receive, at the second switch, the request from the first switch;
   access the second subset table to identify and retrieve the home network information for the first user device, the home network information including identification of a home network for the first user device;
   transmit the home network information for the first user device from the second switch to the first switch;
   receive, at the first switch, a response from the second switch comprising the home network information for the first user device; and
   transmit the home network information for the first user device from the first switch to the access point.

7. The non-transitory machine readable medium of claim 6, wherein the access point is to conduct traffic redirection to the home network for the first user device based at least in part on the home network information provided by the first switch.

8. The non-transitory machine readable medium of claim 6, wherein a master table of home network information for the plurality of user devices is allocated by the central server into a plurality of subset tables for a plurality of switches, the plurality of subset tables including the first subset table for the first switch and the second subset table for the second switch.

9. The non-transitory machine readable medium of claim 8, wherein the first switch and second switch are to receive updates from the central server to the first index table and first subset table and to the second index table and second subset table, respectively.

10. The non-transitory machine readable medium of claim 6, wherein the first switch is further to access the first subset table to determine if the requested home network information for the first user device is stored at the first switch before transmitting the request to the second switch.

11. A method, comprising:
 receiving, by a first switch, a first index table and a first subset table from a central server, the first index table to map a plurality of ranges of users to respective switches for storage of home network information, and the first subset table to map each user of a first range of users to home network information for the user;
 receiving, by a second switch, a second index table and a second subset table from the central server, the index table to map the plurality of ranges of users to respective switches for storage of home network information, and the second subset table to map each user of a second range of users to home network information for the user, the second range of users being different than the first range;
 receiving, by the first switch, a request from an access point for home network information of a first user device of a plurality of user devices;
 accessing the first index table to determine which switch is storing home network information for a range of users including the first user device;
 determining, by the first switch and based on the first index table stored on the first switch, that the second switch is storing the home network information for the first user device, wherein the first switch does not store the home network information for the first user device;
 transmitting, by the first switch, the request received from the access point to the second switch;
 receiving, by the second switch, the request from the first switch;
 accessing, by the second switch, the second subset table to identify and retrieve the home network information for the first user device, the home network information including identification of a home network for the first user device;
 transmitting, by the second switch, the home network information for the first user device to the first switch;
 receiving, by the first switch, a response from the second switch comprising the home network information for the first user device; and
 transmitting, by the first switch, the home network information for the first user device to the access point.

12. The method of claim 11, wherein the access point is to conduct traffic redirection to the home network for the first user device based at least in part on the home network information provided by the first switch.

13. The method of claim 11, wherein a master table of home network information for the plurality of user devices is allocated by the central server into a plurality of subset tables for a plurality of switches, the plurality of subset tables including the first subset table for the first switch and the second subset table for the second switch.

14. The method of claim 13, wherein the first switch and second switch are to receive updates from the central server to the first index table and first subset table and to the second index table and second subset table, respectively.

15. The method of claim 11, wherein the first switch is further to access the first subset table to determine if the requested home network information for the first user device is stored at the first switch in before transmitting the request to the second switch.

* * * * *